United States Patent
Tzeng

(10) Patent No.: US 9,769,047 B2
(45) Date of Patent: *Sep. 19, 2017

(54) TIME SYNCHRONIZATION ARCHITECTURE IN A NETWORK DEVICE

(71) Applicant: Broadcom Corporation, Irvine, CA (US)

(72) Inventor: Shr-Jie Tzeng, Cupertino, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,009

(22) Filed: Feb. 29, 2016

(65) Prior Publication Data

US 2016/0182339 A1 Jun. 23, 2016

Related U.S. Application Data

(63) Continuation of application No. 14/147,025, filed on Jan. 3, 2014, now Pat. No. 9,306,693.

(Continued)

(51) Int. Cl.
*H04L 12/26* (2006.01)
*H04J 3/06* (2006.01)
*H04L 1/00* (2006.01)

(52) U.S. Cl.
CPC .......... *H04L 43/106* (2013.01); *H04J 3/0661* (2013.01); *H04J 3/0667* (2013.01); *H04L 1/00* (2013.01)

(58) Field of Classification Search
CPC ............... H04L 12/2684; H04L 43/106; H04L 2463/121; H04L 41/00; H04L 12/5602;
(Continued)

(56) References Cited

U.S. PATENT DOCUMENTS 4,456,042 A * 6/1984 Clark ..................... B23Q 1/267
144/117.1
5,521,907 A * 5/1996 Ennis, Jr. ............ H04L 41/5038
370/253

(Continued)

*Primary Examiner* — Warner Wong
(74) *Attorney, Agent, or Firm* — McDermott Will & Emery LLP

(57) ABSTRACT

A method of generating timestamp information irrespective of a packet format include generating an egress timestamp corresponding to a time at which a first egress packet associated with a synchronization event is transmitted to a network medium; storing the egress timestamp in a memory based on an egress identifier; and transmitting a second egress packet associated with the synchronization event with the stored egress timestamp being included in the transmitted second egress packet for timing synchronization in the network medium. The method also includes receiving an incoming packet from the network medium; generating an ingress timestamp corresponding to a time at which the incoming packet is received; replacing an error detection field included in the incoming packet with an error detection tag; inserting the ingress timestamp into the error detection tag; and providing the incoming packet with the ingress timestamp to a processor for synchronization of a local clock.

20 Claims, 8 Drawing Sheets

Related U.S. Application Data

(60) Provisional application No. 61/905,024, filed on Nov. 15, 2013.

(58) Field of Classification Search
CPC ............ H04L 2012/5635; H04L 47/10; H04L 2012/5636; H04L 2012/5631; H04L 2012/5625; H04L 49/3081; H04L 12/5615; H04L 12/5601; H04J 3/0638; H04J 3/0685; H04J 3/0632; H04J 3/065; H04J 3/0655; H04J 3/0661; H04W 56/00; H04W 56/001; H04W 56/0085
USPC .......................................... 370/236.1–236.2
See application file for complete search history.

(56) References Cited

U.S. PATENT DOCUMENTS

| | | | |
|---|---|---|---|
| 6,545,979 B1 | 4/2003 | Poulin | |
| 8,135,866 B2 * | 3/2012 | Shatsky | H04L 65/80 709/238 |
| 8,432,630 B1 * | 4/2013 | Lin | G11B 5/455 324/212 |
| 8,718,482 B1 | 5/2014 | Roberts et al. | |
| 8,879,586 B2 * | 11/2014 | Tzeng | H04J 3/0635 370/503 |
| 9,130,687 B2 * | 9/2015 | Webb, III | H04J 3/0635 |
| 9,264,333 B1 * | 2/2016 | Mizrahi | H04J 3/0673 |
| 2005/0053006 A1 | 3/2005 | Hongal et al. | |
| 2009/0122781 A1 | 5/2009 | Voglewede et al. | |
| 2010/0020829 A1 | 1/2010 | Ruffini | |
| 2010/0306527 A1 | 12/2010 | Huin | |
| 2011/0075685 A1 * | 3/2011 | Xu | H04L 27/2663 370/503 |
| 2012/0250704 A1 | 10/2012 | Yamada et al. | |
| 2013/0028265 A1 | 1/2013 | Ronchetti et al. | |
| 2013/0100832 A1 | 4/2013 | Flinn et al. | |
| 2013/0100948 A1 | 4/2013 | Irvine | |
| 2013/0163618 A1 * | 6/2013 | Sergeev | H04J 3/0667 370/503 |
| 2014/0036936 A1 * | 2/2014 | Bui | H04J 3/0664 370/503 |
| 2014/0177653 A1 | 6/2014 | Tzeng | |
| 2014/0192826 A1 * | 7/2014 | Zampetti | H04B 10/07 370/503 |
| 2014/0199072 A1 * | 7/2014 | Nuijts | H04J 3/0682 398/75 |
| 2014/0226683 A1 | 8/2014 | Castiel | |
| 2014/0269672 A1 | 9/2014 | Zampetti | |
| 2014/0281834 A1 | 9/2014 | Hardesty et al. | |
| 2014/0355628 A1 | 12/2014 | Akhlaq et al. | |
| 2015/0063375 A1 | 3/2015 | Tzeng et al. | |
| 2015/0092793 A1 | 4/2015 | Aweya | |
| 2015/0139251 A1 | 5/2015 | Tzeng | |

\* cited by examiner

TIME SYNCHRONIZATION ARCHITECTURE IN A NETWORK DEVICE

CROSS-REFERENCE TO RELATED APPLICATIONS

The present application is a continuation of U.S. patent application Ser. No. 14/147,025 filed on Jan. 3, 2014, entitled "Time Synchronization Architecture in a Network Device," now issued as U.S. Pat. No. 9,306,693, which claims the benefit of U.S. Provisional Patent Application No. 61/905,024 filed on Nov. 15, 2013, entitled "Time Synchronization Architecture in a Network Device," the disclosures of which are hereby incorporated by reference in their entireties.

TECHNICAL FIELD

The present description relates to clock synchronization of networked systems, and more particularly, but not exclusively, to time synchronization architecture in a network device.

BACKGROUND

Timing and frequency synchronization among network entities that communicate with each other is an important issue in network performance. The accuracy of the synchronization between network nodes affects the performance of systems attached to the network and also the overall performance of the network. The IEEE 1588 protocol, referred to as the Precision Time Protocol (PTP), is a technique for providing robust cost-effective time synchronization for distributed systems.

Conventional IEEE 1588 approaches require that every participating network interface (e.g., port) takes very accurate timestamps of selected packet ingress and/or egress, and manages precisely synchronized time. By taking timestamps at the edge of the physical layer for a network interface very close to the network medium, the time difference between when a packet is transmitted from a first network node to that packet being received at a second network node can be minimized.

To perform timestamp functions, the physical layer for the network interface would need to parse the packet using a standard IEEE 1588 packet format. Network nodes that utilize network layer 2 encryption such as MACSec encapsulate and protect the packet. As such, the physical layer would not be able to parse the encrypted packet correctly.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
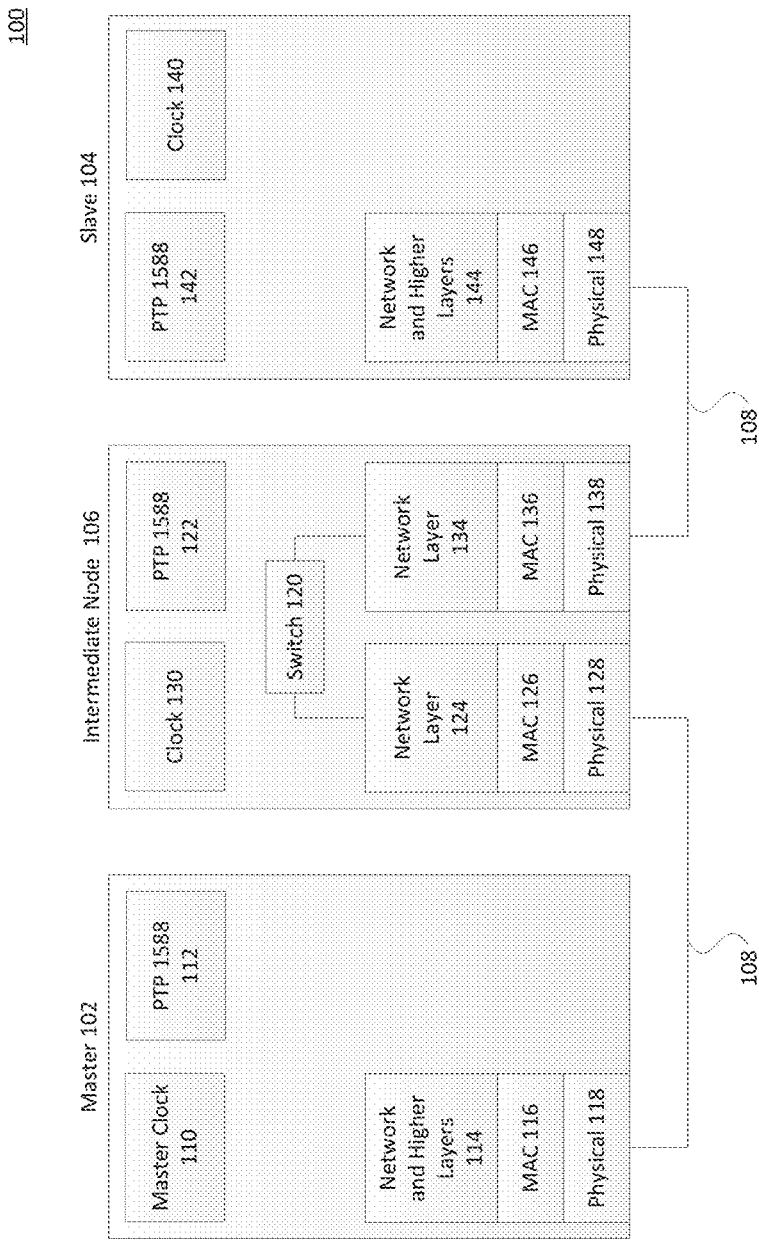
FIG. 1 illustrates an example of a system for synchronizing time between network entities, in accordance with various aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more instances, structures and components are shown in block diagram form in order to avoid obscuring the concepts of the subject technology.

In various aspects, the subject technology relates to systems and methods of time synchronization between network entities, but more particularly, to a time synchronization architecture in a network device that enables timestamp generation irrespective of a packet format. In this respect, the systems and methods include receiving, at a first physical interface, a first egress packet associated with a synchronization event from a processor, transmitting, from a second physical interface, the first egress packet to a network medium for initiating a timing synchronization in the network medium, generating an egress timestamp corresponding to a time at which the first egress packet is transmitted from the second physical interface to the network medium with the egress timestamp being generated irrespective of a packet format of the first egress packet, storing the egress timestamp in a memory based on an egress identifier, receiving, at the first physical interface, a second egress packet associated with the synchronization event from the processor, in which the processor generates the second egress packet based on the stored egress timestamp, and transmitting, from the second physical interface, the second egress packet with the stored egress timestamp being included in the transmitted second egress packet for completing the timing synchronization in the network medium.

The systems and methods also can include receiving, at a first physical interface, an incoming packet from the network medium, generating an ingress timestamp corresponding to a time at which the incoming packet is received, replacing an error detection field included in the incoming packet with an error detection tag, inserting the ingress timestamp into the error detection tag, and sending, from a second physical interface, the incoming packet with the ingress timestamp to a processor for synchronization of a local clock.

Based on the foregoing, the subject technology can avoid the need to parse incoming packets from the network medium using an error-detection tag to facilitate timestamp generation, thus allowing a physical layer device (e.g., PHY) to perform timestamp functions irrespective of whether the incoming packet arrives at the PHY encrypted or not. Conversely, the PHY can provide timestamping functionality while preserving encrypted contents of outgoing packets with the use of the error-detection tag.

FIG. 1 illustrates a system 100 for synchronizing time between network entities, in accordance with various aspects of the subject technology. The system 100 includes a master 102, slave 104, and intermediate node (e.g., switch device) 106, which interconnects master 102 and slave 104. Not all of the depicted components are required, however, and one or more implementations can include additional components not shown in the figure. Variations in the arrangement and type of the components can be made without departing from the spirit or scope of the claims as set forth herein. Additional components, different components, or fewer components can be provided.

The IEEE 1588 protocol is based on packet exchanges between network entities (or network nodes) defined as masters and as slaves (also referred to as master nodes and slave nodes, respectively). Each slave (e.g., slave 104) synchronizes its clock ("slave clock") to the clock of a master (e.g., master 102). To enhance fault tolerance, an election process can determine one among multiple masters to provide the accurate clock at any particular instant to the slaves. The master that is selected to provide the accurate clock, is referred to as a grandmaster.

In various aspects, master 102 provides a master clock 110 to which slave 104 and/or switch 120 synchronizes. Master clock 110 can be based upon a global positioning system (GPS) clock or another accurate clock. Master 102 can include, for example, a GPS receiver (not shown) and GPS clock adjust circuitry (not shown) that can be used by master 102 to keep master clock 110 synchronized with a highly accurate external GPS clock. Master 102 can include one or more computers, such as a server computer or cluster of server computers. Master 102 is coupled to slave 104 and one or more intermediate nodes 106 over a network 108. Network 108 can include a network topology, such as, but not limited to, Ethernet.

Master 102 includes a network protocol stack including a physical layer 118, a media access control (MAC) layer 116, and network and higher layer protocol module 114. Master 102 also includes an IEEE 1588 protocol module 112. Each of the modules 112, 114, 116 and 118 can be implemented in software, firmware, hardware or a combination thereof.

Most networks adhere to the layered approach provided by the open systems interconnect (OSI) reference model. The OSI reference provides a seven (7) layer approach, which includes an application layer (Layer 7), a presentation layer (Layer 6), a session layer (Layer 5), a transport layer (Layer 4), a network layer (Layer 3), a data link layer (Layer 2) and a physical layer (Layer 1). Layer 7 through Layer 5 inclusive can include upper layer protocols, while Layer 4 through Layer 1 can include lower layer protocols. Some networks might utilize only a subset of seven layers.

Layer 7, the application layer, is responsible for supporting network applications such as web browsers and email clients, and is implemented in software in end systems such as personal computers and servers.

Layer 6, the presentation layer, is responsible for masking any differences in data formats that might occur between dissimilar or disparate systems. The presentation layer specifies architecture-independent data transfer formats and can enable encoding, decoding, encryption, decryption, compression and/or decompression of data.

Layer 5, the session layer, is responsible for managing user session dialogues. In this regard, the session layer can be enabled to control establishment and/or termination of logical links between users. The session layer can also be enabled to provide handling and reporting of upper layer errors.

Layer 4, the transport layer, is responsible for passing application layer messages between the client and server sides of an application. In this regard, the transport layer can be enabled to manage end-to-end delivery of messages in the network. The transport layer can include various error recovery and/or flow control mechanisms, which can provide reliable delivery of messages.

Layer 3, the network layer, is responsible for determining how data can be transferred between network devices. Data can be routed according to unique network addresses. In this regard, the network layer can route, for example, datagrams between end systems. Internet Protocol (IP), for example, defines the form and content of the datagrams and is implemented in Layer 3 in combination with any number of routing protocols which can be implemented in the various nodes (devices such as bridges and routers) along a datagram's path from one end system to another. By way of example, the network and higher layer protocol module 114 includes operations to process Layer 3 up to Layer 7 protocols, including, but not limited to, routing and forwarding.

Layer 2, the data link layer, is responsible for moving a packet of data from one node to another. The data link layer defines various procedures and mechanisms for operating communication links and can enable, for example, the framing of packets within the network. The data link layer can enable detection and/or correction of packet errors. The Ethernet (IEEE 802.3) protocol is one common link layer protocol that is used in modern computer networks. By way of example, the MAC layer 116 includes operations to process Layer 2 packet headers and protocols.

Layer 1, the physical layer, is responsible for defining the physical means, which can include optical, electrical and/or mechanical means, for communicating data via network devices over a communication medium, in this regard, Layer 1 includes the conversion of a data stream into a series of physical signals for transmission over a physical medium. Layer 1 technologies such as Ethernet can implement a number of Layer 1 protocols depending on whether the signal is to be transmitted over twisted-pair cabling or over-the-air for example. By way of example, the physical layer 118 includes operations to process Layer 1 protocol aspects and receipt/transmission of packets from/to the network media. Physical layer 118 can be implemented as a physical layer device (sometimes referred to as a PHY).

IEEE 1588 protocol module 112 operates to provide the generation and processing of messages, and maintaining of state related to PTP at master 102. IEEE 1588 protocol module 112 can include functions, such as time stamping and/or classification, implemented in hardware of the physical layer 118 and other functions implemented in software.

Slave 104 includes a network protocol stack including a physical layer 148, a media access control (MAC) layer 146, and network and higher layer protocol module 144. Slave 104 also includes an IEEE 1588 protocol module 142. Each of the modules 142, 144, 146 and 148 can be implemented in software, firmware, hardware or a combination thereof.

IEEE 1588 protocol module 142 operates to provide the generation and processing of messages, and maintaining of state related to PTP at slave 104. IEEE 1588 protocol module 142 can include functions, such as time stamping and/or classification, implemented in hardware of the physical layer 148 and other functions implemented in software. IEEE 1588 module 142 operates to maintain synchronization of slave clock 140 with a master clock, such as master clock 110.

Network and higher layer protocol module 144 includes operations to process Internet protocol (Up) and higher layer (e.g., transport layer), including routing and forwarding. MAC layer 146 includes operations to process Layer 2 packet headers and protocols. Physical layer 148 includes operations to process Layer 1 protocol aspects and receipt/transmission of packets from/to the network media. Physical layer 148 can be implemented as a physical layer device (sometimes referred to as a PHY).

Intermediate node 106 includes a network protocol stack including a physical layer 128 and 138, a media access control (MAC) layer 126 and 136, and network and higher layer protocol modules 124 and 134. Intermediate node 106 includes a switch 120 that operates to route/switch incoming packets to an outgoing interface. For example, packets from master 102 to slave 104 are received on a first physical interface and switched using switch 120 to a second physical interface through which the packet is transmitted to slave 104. Intermediate node 106 also includes an IEEE 1588 protocol module 122 and a clock 130. Each of the modules 120, 122, 124, 126, 128, 134, 136 and 138 can be implemented in software, firmware, hardware or a combination thereof.

IEEE 1588 protocol module 122 operates to provide the determination of residence time of PTP packets and update of timestamps at intermediate node 106. IEEE 1588 protocol module 122 can include functions, such as time stamping and/or classification, implemented in hardware of the physical layer 128 and other functions implemented in software. Note that where intermediate node 106 can be a master and/or slave, in addition to the above operations of IEEE 1588 protocol module 122, operations described with respect to IEEE 1588 protocol modules 112 and 142 such as, for example, generation and processing of messages, and maintaining of state related to PTP, can be provided by IEEE 1588 protocol module 122.

Network and higher layer protocol modules 124 and 134 include operations to process. Internet protocol (IP) and higher layer (e.g., transport layer), including routing and forwarding. MAC layer 126 and 136 includes operations to process Layer 2 packet headers and protocols. Physical layer 128 and 138 includes operations to process Layer 1 protocol aspects and receipt/transmission of packets from/to the network media. Physical layer 128 and 138 can be implemented as physical layer devices (sometimes referred to as a PHY).

At Layer 1, enterprise networks are based predominantly on IEEE 802.3 Ethernet technology. While Ethernet offers ubiquitous and inexpensive connectivity to the Enterprise, it is not particularly strong in controlling access to that network. IEEE standards 802.1ae, 802.1af, and 802.1ar form the basis of an architecture for network access control in Ethernet networks. The IEEE 802.1ae (MACSec) standard defines the data link layer (Layer 2) encryption and authentication mechanisms. IEEE 802.1af defines the control plane and keying protocols for 802.1ae IEEE 802.1ar defines how the network and the devices connected to the network identify and validate each respective identity.

MACSec integrates security into wired Ethernet by identifying the devices connecting to a local area network (LAN) and classifying the devices as authorized or unauthorized. Exemplary network devices that can be identified and classified include, but is not limited to, computers, wireless access points, servers, voice-over-Internet-protocol (VOIP) telephones, routers, switches, bridges and hubs.

Although MACSec can provide greater network security and reliability, upgrading an existing network to be MACSec compatible can be difficult. In this regard, MACSec provides network protection at the data link layer (or Layer 2) by encrypting the data of an Ethernet frame, inserting a header (e.g., SecTAG) between the source MAC address and the encrypted data, and appending an integrity check value (ICV) after the encrypted data. The Ethernet frame also can include a cyclic redundancy check (CRC) field or error detection field to provide error detection for the MACSec packet. Consequently, because the IEEE 1588 protocol requires parsing of a packet in an IEEE 1588 format, the physical layer (or Layer 1) might be unable to process MACSec frames, as the physical layer would not be able to parse the encrypted packet correctly.

As such, there is a need for a timestamp mechanism capable of synchronizing network entities independent of a packet format. The subject technology provides for time synchronization of networked systems irrespective of whether an incoming packet arrives at the PRY encrypted or not.

Figure 2:
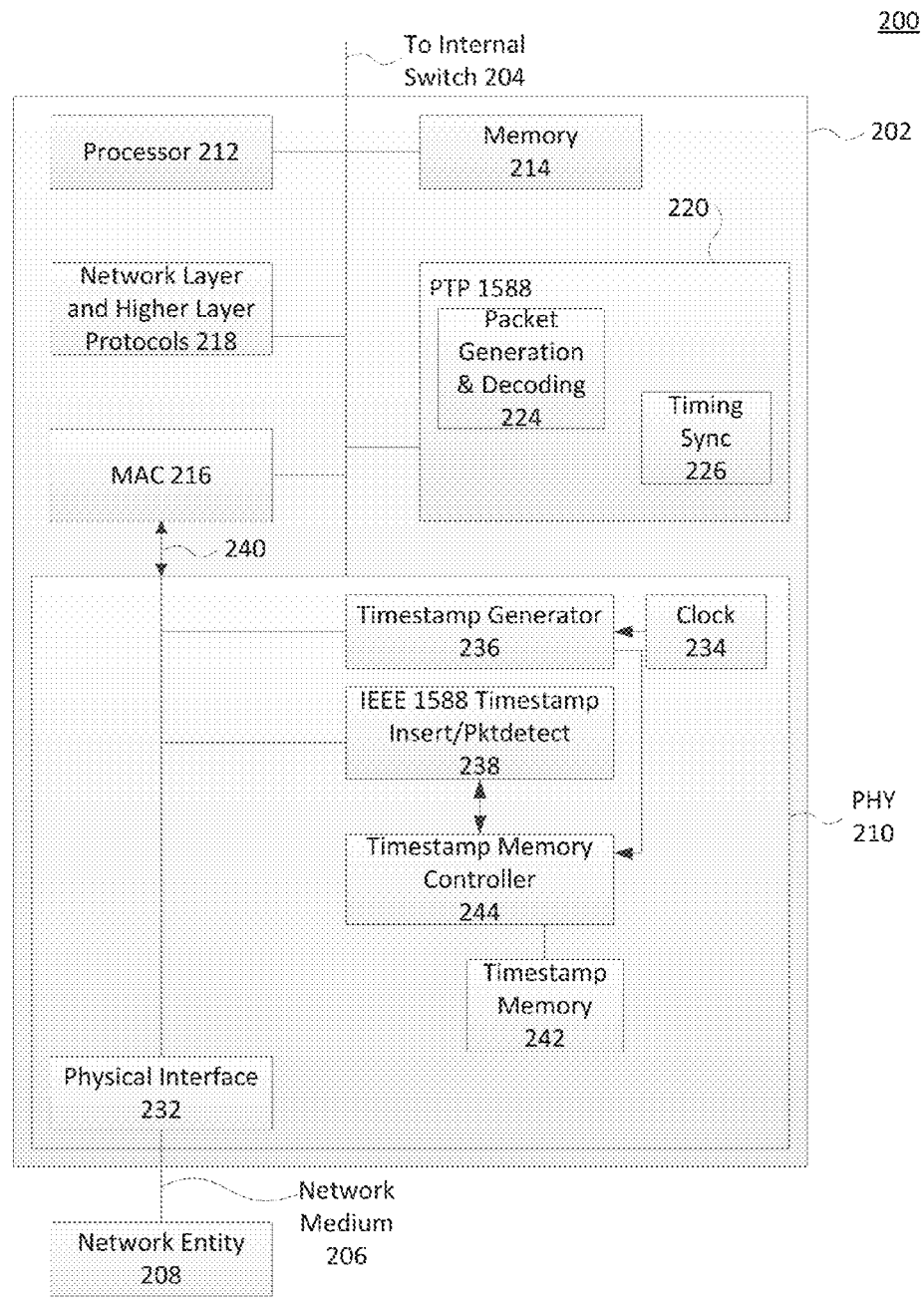
FIG. 2 illustrates an example of a system for time synchronization of network entities, in accordance with various aspects of the subject technology.

FIG. 2 illustrates a system 200 for time synchronization of network entities, in accordance with various aspects of the subject technology. System 200 illustrates a line card 202 in a network entity participating in IEEE 1588 timing synchronization. Not all of the depicted components are required, however, and one or more implementations can include additional components not shown in the figure. Variations in the arrangement and type of the components can be made without departing from the spirit or scope of the claims as set forth herein. Additional components, different components, or fewer components can be provided.

Line card 202 is coupled to an internal switch (not shown) via at least one communications bus 204. The internal switch interconnects line card 202 to other line cards and processing devices of the network entity. The communications bus 204 can include, but is not limited to a serializer/deserializer (SERDES) interface or a quad serial Gigabit media independent interface (QSGMII). The internal switch can include multiple physical ports and can perform packet switching according to one or more routing protocols and/or rules.

Line card 202 can be connected to a network medium 206, such as, but not limited to, an Ethernet network. Network medium 206 interconnects line card 202 to other network entities 208, such as, for example, entities that perform as masters, slaves, and/or intermediate nodes in an IEEE 1588 synchronization network. In various aspects, the network entities 208 include MACSec protocol devices for protecting Ethernet frames traversing the network medium 206.

Line card 202 includes a network physical layer implementation (sometimes referred to as a PHY) 210, a processor 212, a local memory 214, a MAC protocol module 216, a network and higher layer protocol module 218, a IEEE 1588 protocol module 220, and a communications infrastructure (e.g., bus) interconnecting modules 210, 212, 214, 216, 218 and 220.

Processor 212 can include any processor that operates to execute sequences of instructions. Processor 212 can include, for example, a central processing unit (CPU), field programmable gate array (FPGA), application specific integrated circuit (ASIC), or digital signal processor (DSP).

Memory 214 includes a volatile storage memory local to line card 202. Memory 214 can include a dynamic random access memory (DRAM), static random access memory (SRAM), flash memory, or other type of memory. Memory 214 can be utilized by processor 212 to store instructions for execution, configurations, and intermediate results of computations. In some aspects, memory 214 includes a non-volatile storage memory local to line card 202.

MAC protocol module 216 can be implemented in hardware, software, firmware or as a combination thereof. MAC protocol module 216 operates to provide the media access control processing for transmitting and receiving packets from network medium 206.

Network and higher layer protocols module 218 can be implemented in hardware, software, firmware or as a combination thereof. Network and higher layer protocols module 218 operates to provide the network layer (Layer 3) and higher protocol layer (e.g., Layers 4-7) processing for transmitting and receiving packets from network medium 206. For example, generation and reading of packet headers for Layer 3 and above protocols, and routing, are example operations that can be performed by, or assisted in, network and higher layer protocols module 218.

IEEE 1588 protocol module 220 provides for operations required in accordance with the IEEE 1588 protocol. IEEE 1588 protocol module 220 includes a PTP packet generation and decoding module 224 and a timing synchronization module 226. PTP packet generation and decoding module 224 provides for generating packets for synchronization events or defined IEEE 1588 events (e.g. SYNC, DELAY_REQ and DELAY_RSP). In some aspects, the PTP packet generation and decoding module 224 can decode IEEE 1588 packets that are received. Timing synchronization module 226 provides for determining and initiating the adjustment that is to be made to a local clock based upon the timestamps collected based upon the IEEE 1588 synchronization message exchange. In various aspects, the IEEE 1588 protocol module 220 is operative in an ingress data path of the line card 202.

PHY 210 includes a physical interface 232, a clock 234, a timestamp generator 236, and an IEEE 1588 timestamp insert and packet detection module 238. PHY 210 also includes a timestamp memory 242. Access to timestamp memory 242 can be controlled by timestamp memory controller 244. In various aspects, PHY 210 is a chip or a die. In some aspects, PHY 210 is integrated with the other components of line card 202 (e.g., with at least some MAC layer operations) on a single die or chip.

Physical interface 232 operates to transmit packet to, and receive packets from, the network medium 206. In various aspects, physical interface 232 provides one or more Ethernet interfaces (e.g., Gigabit Ethernet or other Ethernet variant) and can include interfaces that use optical and/or electrical signaling to send and receive data. Physical interface 232 is typically at the edge of the PHY 210, just before packets exit PHY 210 on to the network medium. By way of example, physical interface 232 includes, but is not limited to, a Gigabit physical layer (GPHY) media dependent interface (MDI) device, a GPHY physical coding sub-layer (PCS) device, Gigabit media independent interface (GMII) device, or a physical layer interface alike.

Clock 234 is a local clock that provides a timing signal for operations in PHY 210. Clock 234 can be based upon a physical or logical clock. In some aspects, clock 234 is derived from a local oscillator in PHY 210 or a network entity (not shown) that includes PHY 210. In various aspects, clock 234 is based upon a logical clock recovered from a data stream.

Timestamp generator 236, upon being triggered by selected events such as, for example, the receipt of a PTP message or the transmitting of a PTP message, operates to determine (or generate) a timestamp. Timestamp generator 236 captures the current time from clock 234. Based upon the type of message for which the timestamp is captured, timestamp generator 236 can either store the timestamp in the timestamp memory 242 for later use or can record (e.g., write) the timestamp in the packet.

IEEE 1588 timestamp insert and packet detection module 238 operates to detect the type of incoming or outgoing message and to insert (e.g., record or write) the timestamp in the incoming or outgoing packet. In various aspects, the IEEE 1588 timestamp insert and packet detection module 238 can retrieve a timestamp stored in the timestamp memory 242 via the timestamp memory controller 244 for insertion into a packet.

Timestamp memory controller 244 operates to control access to timestamp memory 242. In various aspects, timestamp memory controller 244 can access timestamp entries based upon a combination of fields from the PTP common header (e.g., domain number and sequence ID). Timestamp memory 242 can store timestamps captured by timestamp generator 236 for ingress and egress packets. Other information from the packets that can be used to correlate packets of a message exchange can also be stored in association with the timestamps (e.g., a signature associated with the timestamp). In some implementations, timestamp memory 242 is configured as a first-in-first-out (FIFO) buffer.

Communication between PHY 210 and MAC 216 occurs over a host interface 240. Data (e.g., packets) as well as control signals can be communicated over host interface 240. The host interface 240 can include, but is not limited to, a peripheral component interface (PCI) device or a GMII device. Host interface 240 can also be referred to as media independent interface (MII), PCI and/or management data input/output (MDIO) interface. In some aspects, PHY 210 communicates with a network entity (not shown) that includes MAC 216 using the host interface 240. In this regard, the host interface 240 can communicatively couple PHY 210 to the network entity with the internal switch and bus 204 interconnected between PHY 210 and MAC 216 of the network entity.

Figure 3:
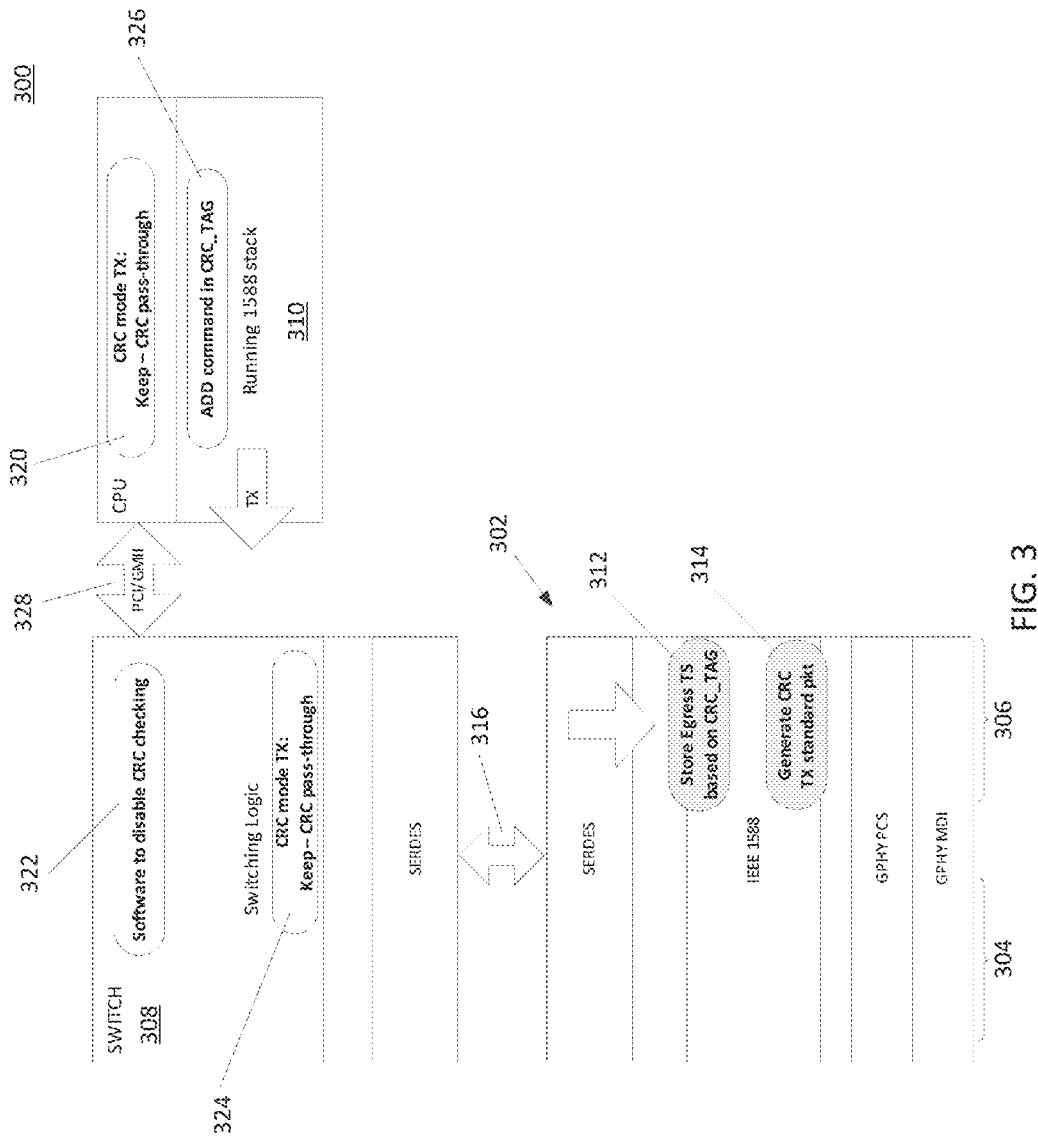
FIG. 3 is a block diagram illustrating an example of an egress data path of a network entity for time synchronization of network entities, in accordance with various aspects of the subject technology.

FIG. 3 is a block diagram illustrating an example of an egress data path of a network entity 300 for time synchronization of network entities, in accordance with various aspects of the subject technology. Not all of the depicted components are required, however, and one or more implementations can include additional components not shown in the figure. Variations in the arrangement and type of the components can be made without departing from the spirit or scope of the claims as set forth herein. Additional components, different components, or fewer components can be provided.

As shown in FIG. 3, the network entity 300 includes a network physical layer device (PHY) 302, a switch 308 and a CPU 310. The PHY 302 can be accessed by the CPU 310 via the switch 308 using a host interface 328. The PHY can be communicatively coupled to the switch 308 using a serializer/deserializer (SERDES) interface 316. The PHY includes an ingress device 304 with an ingress interface that can receive packets from a network medium (e.g., the network medium 206 of FIG. 2), an egress device 306 with an egress interface that can transmit packets to the network medium 206, and a timestamp memory (e.g., the timestamp memory 242). In various aspects, the PHY 302, switch 308 and CPU 310 are integrated on a common die or chip. In some aspects, the PHY 302 is a single die or chip, and separate from the switch 308 and CPU 310 in the network entity.

In operation, the egress device 306 can receive a first egress packet associated with a synchronization event (e.g., SYNC) from the CPU 310 via the host interface 328. In some aspects, the egress packet includes an indication from the CPU 310 to generate a timestamp of the first egress packet.

The egress device 306 can transmit the first egress packet using the egress interface as a synchronization message for a two-step clock scheme of the IEEE 1588 protocol. In this regard, the first egress packet can send an estimated clock value to a slave device in the network medium 206.

Upon transmission of the first egress packet, the egress device 306 via the timestamp generator 236 (FIG. 2) can generate an egress timestamp corresponding to a time at which the first egress packet (e.g., representing all of, or at least a portion of, the synchronization message) is transmitted from the egress device 306 to the network medium 206.

In some aspects, the egress device 306 can determine if at least a portion of the indication matches an egress identifier. In this regard, the egress device 306 can compare a packet identifier of the first egress packet included as part of the indication with an egress identifier maintained by the network entity (or master). The egress identifier can be set by the CPU 310 to identify a packet that has been modified to support the timestamp generation independent of a packet format.

The egress device 306 can store the egress timestamp in the timestamp memory 242 when the packet identifier of the first egress packet is determined to match the egress identifier (e.g., process 312). In various aspects, the egress device 306 can generate a notification to indicate that the egress timestamp is stored in the timestamp memory 242. In turn, the egress device 306 can transmit the notification to the CPU 310 using the host interface 328. In response to the notification, the CPU 310 can perform an MDIO access to retrieve the egress timestamp stored in the timestamp memory 242.

As part of the two-step clock scheme of the IEEE 1588 protocol, the egress device 306 can be utilized to send out a follow-up message to the slave device included in, or coupled to, the network medium 206. In this regard, the egress device 306 can receive a second egress packet associated with the synchronization event from the CPU 310 via the host interface 328.

The egress device 306 can generate an error-detection code (or CRC information) based on content contained in the second egress packet (e.g., process 314). In turn, the egress device 306 can replace an error detection tag included in the second egress packet with the error-detection code. The egress device 306 can transmit the second egress packet to the network medium 206 using the egress interface (e.g., the physical interface 232 of FIG. 2) as a follow-up message to the original synchronization message. In some aspects, the second egress packet contains the egress timestamp to provide the actual clock information to the slave device.

In some aspects, the CPU 310 can disable error detection in the switch 308 before enabling use of the error detection tag (or CRC tag) to allow the first and second egress packets to be forwarded from the CPU 310 to the egress device 306 irrespective of an error detection fault (e.g., processes 320 and 322). The CPU 310 can command the switch 308 to be set in a pass-through mode (e.g., process 324) during a software register setup using a software instruction that is stored in a machine-readable storage medium (e.g., the memory 214 of FIG. 2). The pass-through mode will allow the error detection portion (e.g., CRC field) of the egress packet to pass through the switch 308 without incident since the switch 308 would be expecting to find a standard CRC field rather than the error detection tag that contains the egress timestamp. The CPU 310 also can command an egress MAC (e.g., MAC 216 of FIG. 2) to be set in a pass-through mode such that the outgoing egress packet with the error detection tag can be transmitted without causing the egress device 306 and/or the network entity 300 to function improperly.

The CPU 310 can generate the first and second egress packets including the insertion of an error detection tag that provides an indication that timestamp generation irrespective of a packet format is being enabled by the network entity (e.g., process 326. In this regard, the egress device 306 would be able to generate a timestamp for a MACSec frame or packet and/or a packet with any other format, for example.

In some implementations, the first egress packet includes a request from the CPU 310 for the egress device 306 to generate the egress timestamp. As part of the request, the CPU 310 can insert a packet identifier that is associated with the first egress packet into the error detection tag with a value equal to the egress identifier. The CPU 310 then sends the first and second egress packets to the egress device 306 via the switch 308 at respective times (e.g., first time for the synchronization message and second time for the follow-up message).

In various aspects, the CPU 310 might need to retrieve multiple timestamps stored in the timestamp memory 242 due to the multitask nature of the CPU 310. As such, the CPU 310 can assign a signature to at least the first egress packet, which is generated to be unique for each egress event packet. In this regard, the CPU 310 can distinguish between the stored timestamps. The signature can be composed of a port number in an upper portion of the signature and a sequence identifier in a PTP stack for the remaining portion of the signature. The CPU 310 can use the signature to retrieve the stored egress timestamp from the timestamp memory 242 in response to the notification sent from the egress device 306.

When the egress device 306 receives an indication from the CPU 310 to generate and/or add an egress timestamp to an egress packet (e.g., the second egress packet as, or part of, the follow-up message), the egress device 306 can compare the packet identifier of the first egress packet with the egress identifier to determine a match. The egress timestamp can be stored in the timestamp memory 242 when a match is determined between the packet identifier of the first egress packet and the egress identifier. In addition, the egress device 306 can store the signature of the egress timestamp of the first egress packet in the timestamp memory 242 with the signature and the egress timestamp being associated with a common location in the timestamp memory 242. In this regard, the signature allows the CPU 310 to differentiate egress timestamps stored in the timestamp memory 242. In addition, there might be no need to store source/destination addresses, source/destination IP information, a PTP clock identifier, and/or a sequence identifier associated with the first egress packet, for example.

Figure 4:
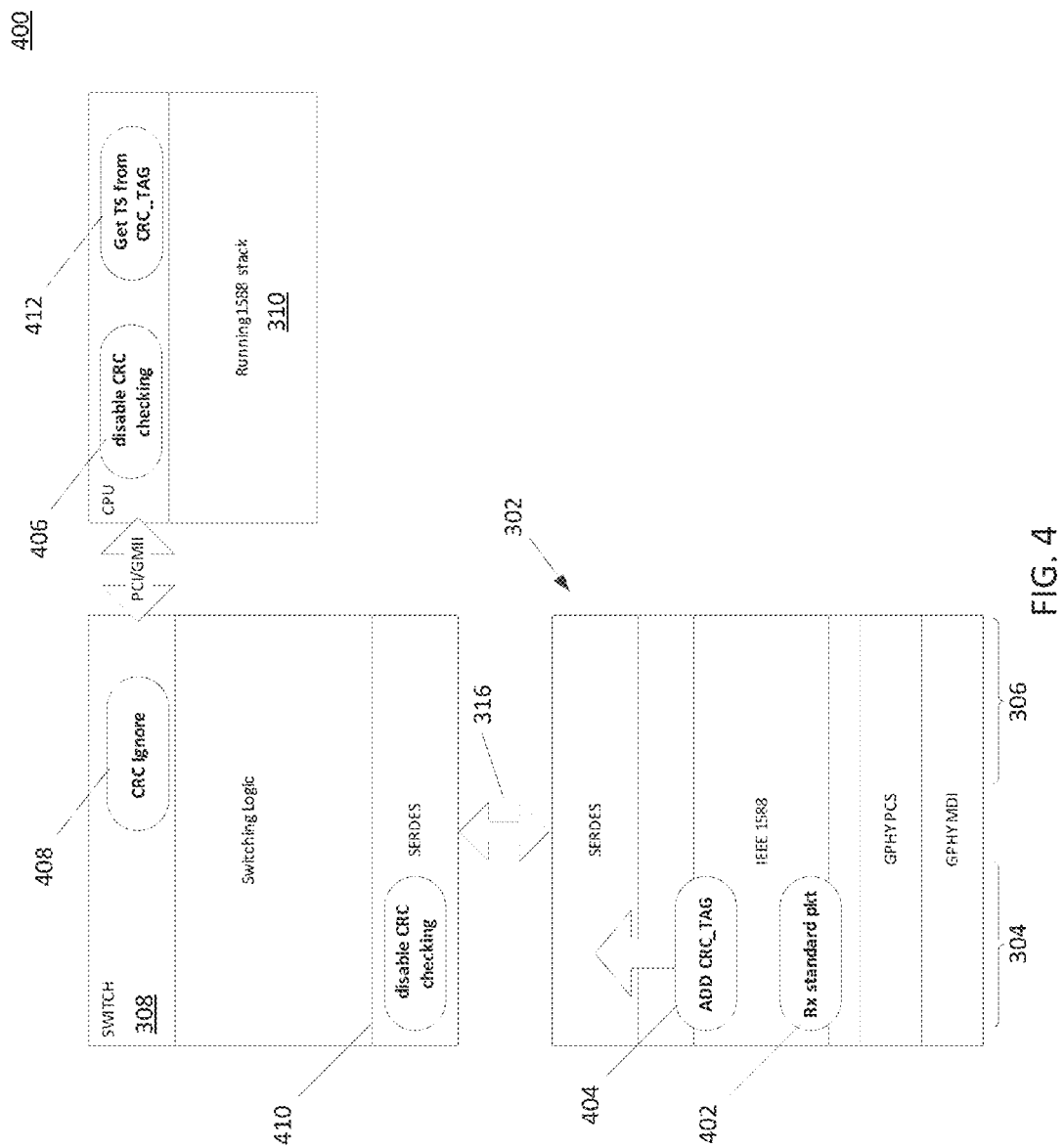
FIG. 4 is a block diagram illustrating an example of an ingress data path of a network entity for time synchronization of network entities, in accordance with various aspects of the subject technology.

FIG. 4 is a block diagram illustrating an example of an ingress data path of a network entity for time synchronization of network entities, in accordance with various aspects of the subject technology. Because the network entity 400 is substantially similar to the network entity 300 of FIG. 3, only the differences will be discussed with respect to FIG. 4.

As shown in FIG. 4, the network entity 400 includes a network physical layer device (PHY) 302, a switch 308 and a CPU 310. The PHY includes an ingress device 304 with an ingress interface that can receive packets from a network medium (e.g., the network medium 206 of FIG. 2), an egress device 306 with an egress interface that can transmit packets to the network medium 206, and the timestamp memory 242.

The ingress device 304 can receive an incoming packet from the network medium 206 using the ingress interface (e.g., process 402). In cases where MACSec is enabled, the incoming packet is encrypted. In this regard, the PTP packet generation and decoding module 224 (FIG. 2) would not be able to identify the incoming packet since the incoming packet would not be in the IEEE 1588 packet format. As such, the ingress device 304 can generate an ingress timestamp corresponding to a time at which the incoming packet is received at the ingress device 304.

The incoming packet can include an error detection field (or CRC field) that provides error detection information for the incoming packet. To facilitate the timestamp generation irrespective of a packet format, the ingress device 304 can insert an error detection tag where the error detection field is located within the incoming packet (e.g., replace the standard CRC field). In turn, the ingress device 304 can supply the ingress timestamp within the error detection tag (e.g., process 404). In some aspects, the ingress device 304 can perform an error detection operation of the incoming packet, and provide an indication of the error detection result in the error detection tag. The ingress device 304 can then forward the incoming packet with the ingress timestamp to the switch 308.

The switch 308 can receive the incoming packet using the SERDES interface 316 and decode the incoming packet using the error detection tag to determine whether or not the incoming packet is IEEE 1588 related. If so, the switch 308 can then forward the incoming packet to the CPU 310 for further IEEE 1588 protocol processing. Otherwise, the switch 308 can route the incoming packet (e.g., non-1588 related packet) locally within the network entity. In some aspects, the switch 308 can identify the incoming packet even if the incoming packet includes a packet format that is not supported by the PHY 302 (e.g., the incoming packet is a MACSec packet). In this regard, the switch 308 can determine whether or not to use, or the CPU 310 can use, the ingress timestamp contained therein.

In various aspects, the CPU 310 can disable error detection in the switch 308 during a software register setup using an executable instruction stored in the memory 214 (e.g., processes 406 and 410). In this regard, the CPU can set the switch 308 in a CRC-ignore mode (or an error-ignore mode) to allow the incoming packet to be forwarded from the ingress device 304 to the CPU 310 irrespective of an error detection fault (e.g., process 408). By way of example, the switch 308 can ignore any CRC errors detected by the ingress device 304 using the indication (e.g., a CRC flag) provided within the error detection tag that is inserted into the incoming packet. In turn, the CPU 310 can retrieve and/or parse the ingress timestamp from the error detection tag to synchronize a local clock of the network entity (e.g., a slave clock).

Figure 5A:
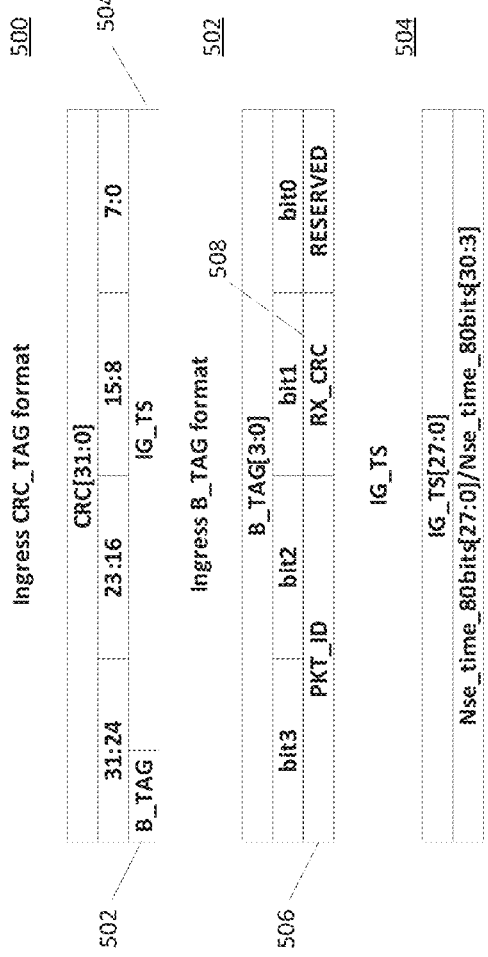
FIGS. 5A-5B illustrate examples of packet formats for time synchronization of network entities, in accordance with various aspects of the subject technology.
Figure 5B:
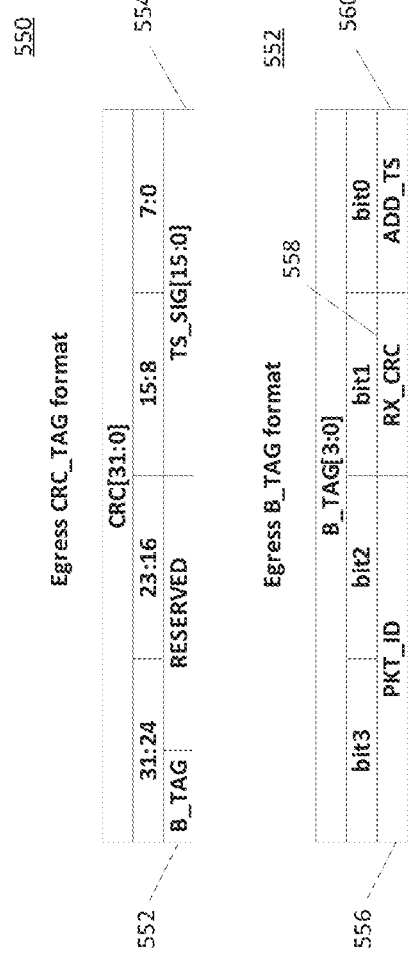

FIGS. 5A-5B illustrate examples of packet formats for time synchronization of network entities, in accordance with various aspects of the subject technology, with FIG. 5A illustrating an ingress packet format 500, and FIG. 5B illustrating an egress packet format 550. Not all of the depicted components are required, however, and one or more implementations can include additional components not shown in the figure. Variations in the arrangement and type of the components can be made without departing from the spirit or scope of the claims as set forth herein. Additional components, different components, or fewer components can be provided.

In various aspects, a packet structure includes, but is not limited to, a preamble, source/destination address fields, a data payload and a CRC field. Referring to FIG. 5A, the ingress packet format 500 can represent the CRC field with the ingress packet format 500 including a tag field 502 and a timestamp field 504. The tag field 502 can include a packet identifier field 506 and a CRC flag 508. In some aspects, the tag field 502 includes a reserved section. The timestamp field 304 can include a first timestamp format or a second timestamp format depending on implementation.

The packet identifier field 506 can identify a corresponding packet processed by the PHY 302 (FIG. 3). The packet identifier field 506 can be controlled by a specified software and/or hardware register included in, or coupled to, the PHY 302. In some aspects, the packet identifier field 506 can be populated with a value equivalent to the ingress identifier. The ingress identifier can be maintained and/or generated by the CPU 310 (FIG. 3) to assist in distinguishing ingress and egress packets that can traverse through the switch 308 (FIG. 3).

The CRC flag 508 can represent the CRC correctness of the corresponding packet when the ingress of the IEEE 1588 protocol module 220 (e.g., packet generation and decoding module 224 of FIG. 2) receives an incoming packet from the physical interface 232 (e.g., the GPHY MDI). The ingress device 304 can validate the incoming packet and issue a validation result as a binary value in the CRC flag 508. By way of example, if the CRC is incorrect, then the CRC flag 508 is set as a logical one "1". Otherwise, the CRC flag 508 can be set to a logical zero "0" when the CRC is correct. In some aspects, the switch 308 and/or the network and higher layer protocol module 218 (FIG. 2) can decide what to do when a CRC error is received by the PHY 302 that is capable of receiving an error detection tag.

The timestamp field 504 can include counter values that represent respective timestamp formats. The timestamp format can be controlled by a software and/or hardware register (e.g., an internal chip register) on a per-chip basis. In this regard, the register can include an indication (e.g., defined as a binary value) to provide either a first timestamp format for higher frequency synchronization or a second timestamp format for lower frequency synchronization.

Because the egress packet format 550 is substantially similar to the ingress packet format 500 of FIG. 5A, only the differences will be discussed with respect to FIG. 5B. Referring to FIG. 5B, the egress packet format 550 can represent the CRC field with the ingress packet format 550 including a tag field 552 and a timestamp field 554. The tag field 552 can include a packet identifier field 556, a CRC flag 558 and a timestamp add notice 560. In some aspects, the egress packet format 550 includes a reserved section located between the tag field 552 and the timestamp field 554. The timestamp field 504 can include a first timestamp format or a second timestamp format depending on implementation.

Figure 6:
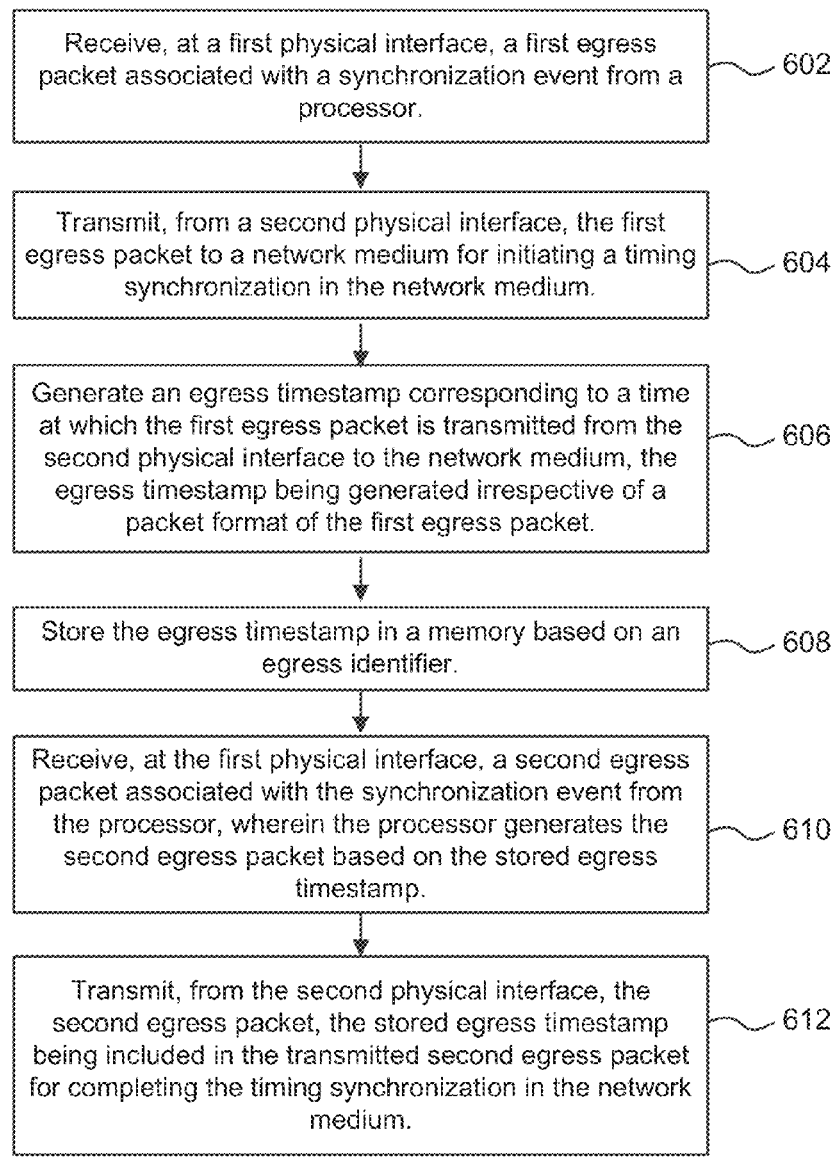
FIG. 6 illustrates an example of a method of an egress data path for time synchronization of network entities, in accordance with various aspects of the subject technology.

FIG. 6 illustrates an example of a method 600 of an egress data path for time synchronization of network entities, in accordance with various aspects of the subject technology. PHY 210 of FIG. 2 and/or PHY 302 of FIG. 3, for example, can be used to implement method 600. However, method 600 can also be implemented by systems having other configurations. Although method 600 is described herein with reference to the examples of FIGS. 3 and 5A, method 600 is not limited to these examples. Furthermore, although method 600 is illustrated in the order shown in FIG. 6, it is understood that method 600 can be implemented in a different order.

Method 600 includes processes 602, 604, 606, 608, 610 and 612. Processes 602 and 610 can be implemented by PTP packet generation and decoding module 224 and/or IEEE 1588 timestamp insert and packet detection module 238. Process 606 can be implemented by timestamp generator 236. Process 608 can be implemented by timestamp memory controller 244 and timestamp memory 242. Processes 604 and 612 can be implemented by IEEE 1588 timestamp insert and packet detection module 238 and physical interface 232. Although the processes implemented by PTP packet generation and decoding module 224, timestamp generator 236, IEEE 1588 timestamp insert and packet detection module 238, timestamp memory controller 244 and timestamp memory 242 are described as being part of method 600, the processes implemented by PTP packet generation and decoding module 224, timestamp generator 236, IEEE 1588 timestamp insert and packet detection module 238, timestamp memory controller 244 and timestamp memory 242 can, in certain aspects, be considered as separate methods.

Method 600 facilitates the generation of timestamps for egress packets irrespective of a packet format. As such, the method 600 can facilitate the time synchronization between network entities that include communication of MACSec packets or frames, for example.

Process 602 includes receiving, at a first physical interface (e.g., serializer/deserializer (SERDES) interface), a first egress packet associated with a synchronization event (e.g., an IEEE 1588 synchronization event) from a processor (e.g., CPU 310 of FIG. 3). In various aspects, the first egress packet includes an error detection tag having information to facilitate egress timestamp generation irrespective of a packet format. The error detection tag can include a format such as the egress packet format 550 (FIG. 5B).

Upon receiving the first egress packet, the IEEE 1588 timestamp insert and packet detection module 238 can inspect the packet to determine if the error detection tag is included, which is indicative of a modified scheme for timestamp generation. In this regard, the modified scheme can include generating timestamps without the need to parse the packet using an IEEE 1588 packet format.

In receiving the first egress packet, the method 600 also can include a process for receiving a command to read an egress register that includes an egress identifier and an associated egress command. The egress identifier can identify a corresponding packet that has been, or intends to be, modified to support the inclusion of the error detection tag. In various aspects, the error detection tag includes a packet identifier (e.g., the packet identifier 556 of FIG. 5B) for identifying the corresponding packet modified to support timestamp generation independent of a packet format. In some aspects, the egress register is populated with specified values during an initialization of the system (e.g., the line card 202 of FIG. 2) and/or a software register setup process.

In some implementations, the method 600 can include a process for determining that the packet identifier is to be compared with the egress identifier based on the associated egress command. As such, the IEEE 1588 timestamp insert and packet detection module 238 can compare the packet identifier of the first egress packet with the egress identifier to determine a match. In this regard, the egress timestamp can be stored in the memory (e.g., the timestamp memory 242) when a match is determined between the packet identifier of the first egress packet and the egress identifier.

Process 604 includes transmitting, from a second physical interface (e.g., GPHY MDI), the first egress packet to a network medium for initiating a timing synchronization in the network medium. In turn, process 606 includes generating an egress timestamp corresponding to a time at which the first egress packet is transmitted from the second physical interface to the network medium with the egress timestamp being generated irrespective of a packet format of the first egress packet. The egress register can include an indication of a format for the egress timestamp with the egress timestamp being generated in a specified format based on the indication. By way of example, the egress timestamp can include a first format for higher frequency systems, or in the alternative, a second format for lower frequency systems.

Process 608 includes storing the egress timestamp in the timestamp memory 242 based on the egress identifier. In this regard, if the packet identifier matches the egress identifier, then the IEEE 1588 timestamp insert and packet detection module 238 can instruct the timestamp memory via the timestamp memory controller 244 to store the egress timestamp. In various aspects, the error detection tag of the first egress packet includes an indication from the CPU 310 (FIG. 3) to store the egress timestamp in the timestamp memory 242. The indication can be a flag to notify the IEEE 1588 timestamp insert and packet detection module 238 that an associated IEEE 1588 event is in progress and the CPU 310 needs access to the egress timestamp. The method 500 also can include a process for generating a notification to indicate that the egress timestamp is stored in the timestamp memory 242. By way of example, the timestamp generator 236 and/or the IEEE 1588 timestamp insert and packet detection module 238 can create the notification upon receiving confirmation from the timestamp memory controller 244 that the egress timestamp has been stored in the timestamp memory 242. In addition, the method 600 can include a process for transmitting the notification to the processor (e.g., the CPU 310) using the host interface (e.g., PCI, GMII) 328.

The method 500 also can include a process for storing a signature of the egress timestamp of the first egress packet with the signature and the egress timestamp being associated with a common location in the timestamp memory 242. In some aspects, the signature can be utilized to identify the corresponding egress timestamp for efficient indexing of the timestamp memory 242. The signature can be generated by the CPU 310 and sent with the corresponding IEEE 1588 event packet (e.g., the first egress packet). Given the multi-tasking nature of the CPU 310, the method 600 also can include a process for storing multiple egress timestamps in the timestamp memory 242 with each of the egress timestamps being associated with a respective signature. In this regard, each egress timestamp can be distinguishable by virtue of the associated signature.

Process 610 includes receiving, at the first physical interface, a second egress packet associated with the synchronization event from the CPU 310. In various aspects, the CPU 310 acquires the egress timestamp to provide a follow-up message as part of the two-step clock scheme of the IEEE 1588 protocol. In this regard, the CPU 310 generates the second egress packet based on the stored egress timestamp. The egress timestamp can be provided within (or inserted into) the second egress packet such that the follow-up message provides actual clock information for completing the timing synchronization in slave devices.

In order for the modified timestamp generation scheme using the error detection tag to function correctly, the receiving slave devices, for example, would need to process the egress packets properly. As such, the method 600 can include a process for generating an error detection code based on content included in the second egress packet with the error detection code being able to provide error detection for the second egress packet. In turn, the method 600 can include a process for replacing the error detection tag with the error detection code with the second egress packet being transmitted to the network medium with the error detection code. In this regard, the second egress packet would be modified to appear as a standard egress packet even though the second egress packet originally contained the error detection tag.

Process 612 includes transmitting, from the second physical interface, the second egress packet with the stored egress timestamp being included in the transmitted second egress packet for completing the timing synchronization in the network medium (e.g., at the slave devices).

Figure 7:
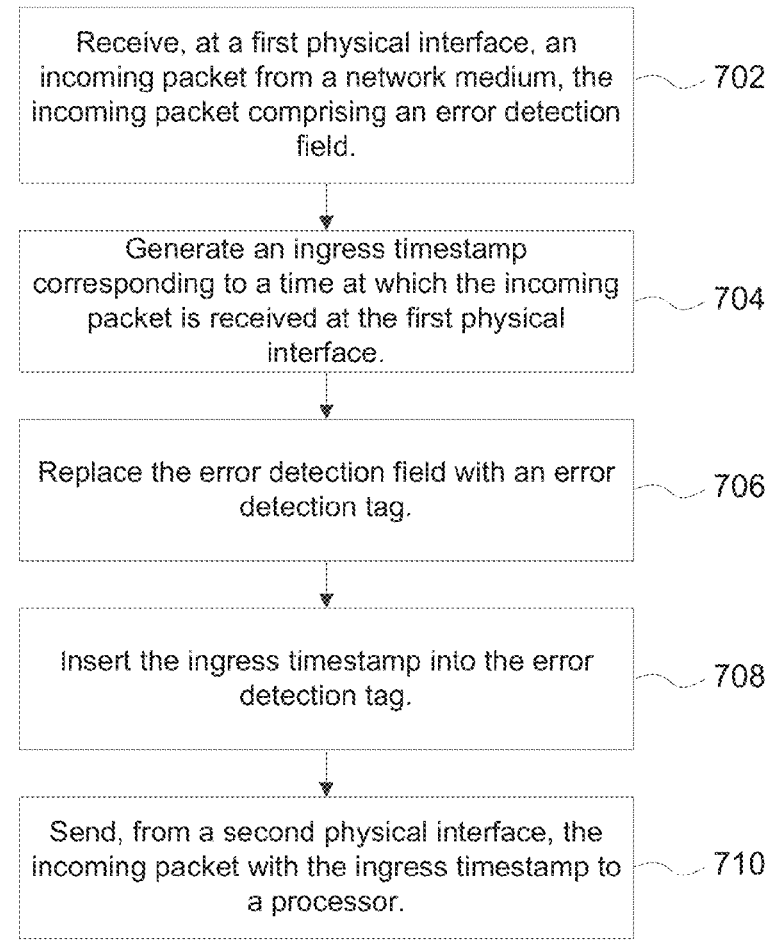
FIG. 7 illustrates an example of a method of an ingress data path for time synchronization of network entities, in accordance with various aspects of the subject technology.

FIG. 7 illustrates an example of a method 700 of an ingress data path for time synchronization of network entities, in accordance with various aspects of the subject technology. PHY 210 of FIG. 2 and/or PHY 302 of FIG. 4, for example, can be used to implement method 700. However, method 700 can also be implemented by systems having other configurations. Although method 700 is described herein with reference to the examples of FIGS. 3 and 5A, method 700 is not limited to these examples. Furthermore, although method 700 is illustrated in the order shown in FIG. 7, it is understood that method 700 can be implemented in a different order.

Method 700 includes processes 702, 704, 706, 708 and 710. Processes 702 and 706 can be implemented by PTP packet generation and decoding module 224 and/or IEEE 1588 timestamp insert and packet detection module 238. Process 704 can be implemented by timestamp generator 236. Process 708 can be implemented by IEEE 1588 timestamp insert and packet detection module 238. Process 710 can be implemented by PTP packet generation and decoding module 224 and bus 204. Although the processes implemented by bus 204, PTP packet generation and decoding module 224, timestamp generator 236, and IEEE 1588 timestamp insert and packet detection module 238 are described as being part of method 600, the processes implemented by bus 204, PTP packet generation and decoding module 224, timestamp generator 236, and IEEE 1588 timestamp insert and packet detection module 238 can, in certain aspects, be considered as separate methods.

Process 702 includes receiving, at a first physical interface (e.g., the physical interface 232, GPHY MDI), an incoming packet from a network medium (e.g., the network medium 206 of FIG. 2) with the incoming packet including an error detection field. The error detection field provides error detection information for the incoming packet. However, for the modified timestamp generation scheme to function correctly, the error detection field will need to be replaced with a modified structure that includes information for facilitating timestamp generation irrespective of a packet format. In this regard, the PHY 210 would be able to create a timestamp of the incoming packet even if the incoming packet was in an IEEE MACSec format, for example.

Process 704 includes generating an ingress timestamp corresponding to a time at which the incoming packet is received at the physical interface 232. In turn, the process 706 includes replacing the error detection field with an error detection tag. In this regard, the error detection tag can occupy the same number of bits previously occupied by the error detection field. The error detection tag can include a format such as the ingress packet format 500 (FIG. 5A).

The method 700 also can include a process for performing an error detection operation on the incoming packet with the error detection tag including an indication of a result from the error detection operation. The indication can include a CRC flag that indicates whether the incoming packet contains any CRC errors. If the incoming packet does contain a CRC error, an ingress register and/or the egress register can be set to denote that a CRC egress packet needs to be generated based on the corresponding packet (e.g., the incoming packet at the ingress) containing the CRC error. In some aspects, the ingress register and the egress register are a common register implemented in hardware and/or software.

The method 700 also can include a process for reading the ingress register that contains an ingress identifier. The ingress identifier is used to identify the corresponding packet having been modified to support timestamp generating irrespective to a packet format. The method 700 also can include a process for inserting a packet identifier based on the ingress identifier into the error detection tag including an indication that the incoming packet has been modified with the error detection tag. The indication can be used by the CPU 310 to denote that the incoming packet relates to an IEEE 1588 event.

In turn, process 708 includes inserting the ingress timestamp into the error detection tag, and process 710 includes sending, from a second physical interface (e.g., SERDES), the incoming packet with the ingress timestamp to the CPU 310. Upon receipt of the ingress timestamp, the CPU 310 can utilize the ingress timestamp to synchronize a local clock of the system.

Figure 8:
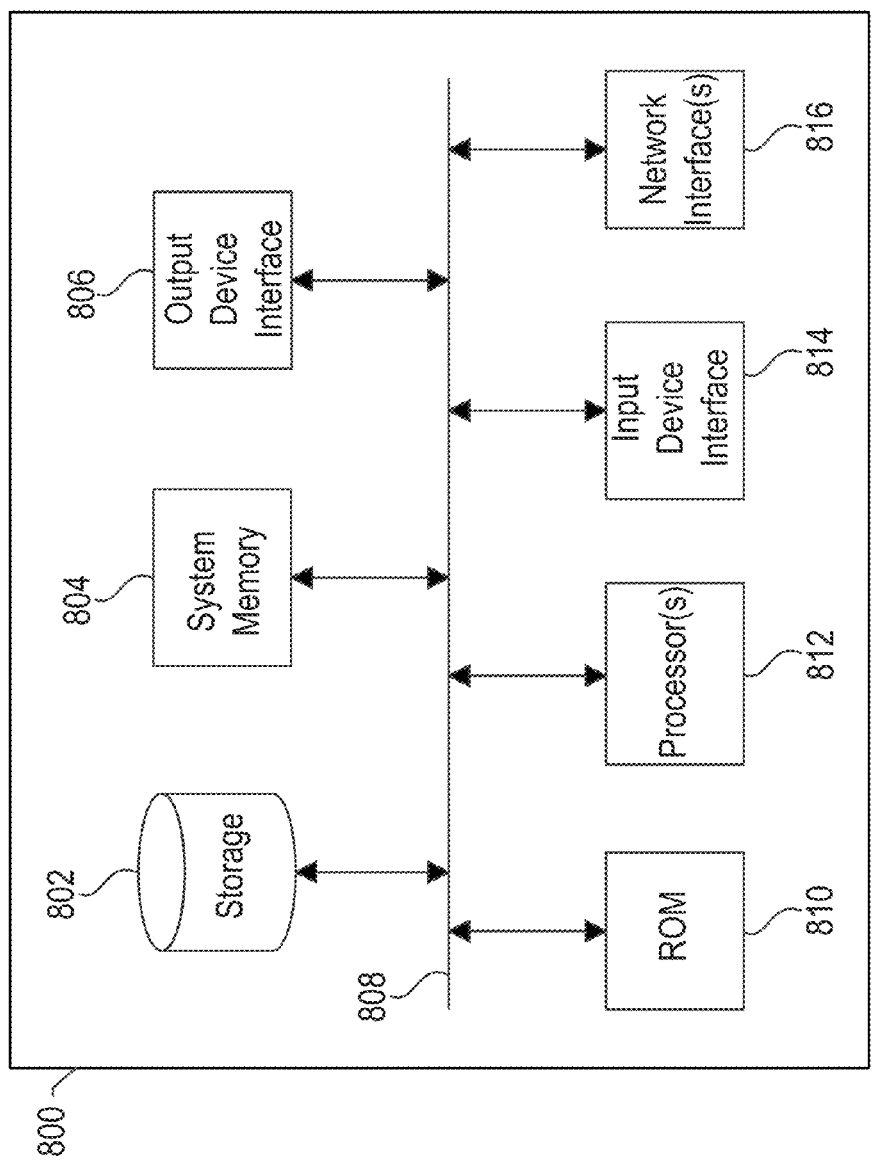
FIG. 8 conceptually illustrates an electronic system with which aspects of the subject technology can be implemented.

FIG. 8 conceptually illustrates an electronic system 800 with which one or more implementations of the subject technology can be implemented. Not all of the depicted components are required, however, and one or more implementations can include additional components not shown in the figure. Variations in the arrangement and type of the components can be made without departing from the spirit or scope of the claims as set forth herein. Additional components, different components, or fewer components can be provided.

The electronic system 800, for example, can be a desktop computer, a laptop computer, a tablet computer, a server, a switch, a router, a base station, a receiver, a phone, a personal digital assistant (PDA), or generally any electronic device that transmits signals over a network. The electronic system 800 can be, and/or can be a part of master 102, slave 104, and/or intermediate node 106 (FIG. 1). Such an electronic system 800 includes various types of computer readable media and interfaces for various other types of computer readable media. The electronic system 800 includes a bus 808, one or more processing unit(s) 812, a system memory 804, a read-only memory (ROM) 810, a permanent storage device 802, an input device interface 814, an output device interface 806, and one or more network interfaces 816, or subsets and variations thereof. The network interfaces 816 can include a local area network (LAN) interface and a wide area network (WAN) interface.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, can be a read-and-write memory device. The permanent storage device 802 can be a non-volatile memory unit that stores instructions and data even when the electronic system 800 is off. In one or more implementations, a mass-storage device (such as a magnetic or optical disk and its corresponding disk drive) can be used as the permanent storage device 802.

In one or more implementations, a removable storage device (such as a flash drive or a universal serial bus (USB) drive) can be used as the permanent storage device 802. Like the permanent storage device 802, the system memory 804 can be a read-and-write memory device. However, unlike the permanent storage device 802, the system memory 804 can be a volatile read-and-write memory, such as random access memory. The system memory 804 can store any of the instructions and data that one or more processing unit(s) 812 might need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

In some aspects, the electronic system 800 includes a computer program product with instructions stored in a tangible computer-readable storage medium such as permanent storage device 802. The instructions can include instructions for receiving, at a first physical interface, a first egress packet associated with a synchronization event from a processor, instructions for transmitting, from a second physical interface, the first egress packet to a network medium for initiating a timing synchronization in the network medium, instructions for generating an egress timestamp corresponding to a time at which the first egress packet is transmitted from the second physical interface to the network medium with the egress timestamp being generated irrespective of a packet format of the first egress packet, instructions for storing the egress timestamp in a memory based on an egress identifier, instructions for receiving, at the first physical interface, a second egress packet associated with the synchronization event from the processor, in which the processor generates the second egress packet based on the stored egress timestamp, and instructions for transmitting, from the second physical interface, the second egress packet with the stored egress timestamp being included in the transmitted second egress packet for completing the timing synchronization in the network medium.

In various aspects, the computer program product of the electronic system 800 includes instructions for receiving, at a first physical interface, an incoming packet from a network medium with the incoming packet including an error detection field, instructions for generating an ingress timestamp corresponding to a time at which the incoming packet is received at the first physical interface, instructions for replacing the error detection field with an error detection tag, instructions for inserting the ingress timestamp into the error detection tag, and instructions for providing the incoming packet with the ingress timestamp to a processor.

The bus 808 also connects to the input and output device interfaces 814 and 806. The input device interface 814 enables a user to communicate information and select commands to the electronic system 800. Input devices that can be used with the input device interface 814 can include, for example, alphanumeric keyboards and pointing devices (also called "cursor control devices"). The output device interface 806 can enable, for example, the display of images generated by electronic system 800. Output devices that can be used with the output device interface 806 can include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations can include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to a network (not shown) through one or more of the network interfaces 816. For example, the bus 808 can couple the electronic system 800 to a network through a LAN interface and separately, or jointly, through a WAN interface. In this manner, the electronic system 800 can be a part of a network of computers, such as a LAN through the LAN interface, a WAN through the WAN interface, an Intranet through either of the LAN or WAN interfaces, or a network of networks through either of the LAN or WAN interfaces, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs), in one or more implementations, such integrated circuits execute instructions that are stored on the circuit itself.

Those of skill in the art would appreciate that the various illustrative blocks, modules, elements, components, methods, and algorithms described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more implementations, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) can apply to all configurations, or one or more configurations. A disclosure relating to such phrase(s) can provide one or more examples. A phrase such as an aspect or some aspects can refer to one or more aspects and vice versa, and this applies similarly to other foregoing phrases.

Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

What is claimed is:

1. A method, comprising:
   generating an egress timestamp corresponding to a time at which a first egress packet is transmitted from a physical interface to a network medium, the first egress packet being associated with a synchronization event, and the egress timestamp being generated irrespective of a packet format of the first egress packet;

providing the egress timestamp for storage in a memory;

receiving a second egress packet associated with the synchronization event, the second egress packet having been generated based at least on the egress timestamp; and transmitting, from the physical interface, the second egress packet, the egress timestamp being included in the transmitted second egress packet.

2. The method of claim 1, further comprising:

generating an error detection code based on content included in the received second egress packet; and replacing an error detection tag of the received second egress packet with the error detection code, wherein the second egress packet is transmitted to the network medium with the error detection code.

3. The method of claim 1, wherein the first egress packet comprises a packet identifier, the method further comprising:

receiving a command to read an egress register that comprises an egress identifier; and comparing the packet identifier with the egress identifier, wherein the egress timestamp is stored in the memory when the egress identifier matches the packet identifier.

4. The method of claim 3, wherein the egress register further comprises an indication of a timestamp format, and the egress timestamp is generated based on the indication.

5. The method of claim 1, further comprising transmitting a notification to indicate that the egress timestamp is stored in the memory, the second egress packet being generated responsive to the notification.

6. The method of claim 1, wherein the first egress packet comprises an indication, and the generating the egress timestamp is in response to the indication.

7. The method of claim 1, further comprising providing for storage a plurality of egress timestamps in the memory, each of the plurality of egress timestamps being associated with a respective signature.

8. A device, comprising:

at least one processor circuit configured to:

generate an egress timestamp indicative of a time at which a first egress packet is transmitted to a network medium, the first egress packet being associated with an event;

receive, at a first interface of the device, a second egress packet associated with the event, the second egress packet having been generated based at least on the egress timestamp; and transmit, at a second interface of the device, the second egress packet to the network medium, the egress timestamp being included in the transmitted second egress packet.

9. The device of claim 8, wherein the at least one processor circuit is further configured to:

generate an error detection code based on content included in the received second egress packet; and replace an error detection tag of the received second egress packet with the error detection code, wherein the second egress packet is transmitted to the network medium with the error detection code.

10. The device of claim 8, wherein the first egress packet comprises a packet identifier, the at least one processor circuit being further configured to:

receive a command to read an egress register that comprises an egress identifier;

compare the packet identifier with the egress identifier; and store the egress timestamp in a memory when the egress identifier matches the packet identifier.

11. The device of claim 8, wherein the at least one processor circuit is configured to generate the egress timestamp in response to an indication contained in the first egress packet.

12. The device of claim 8, wherein the at least one processor circuit is further configured to transmit a notification to indicate that the egress timestamp is stored in a memory, the second egress packet being generated responsive to the notification.

13. The device of claim 12, wherein the at least one processor circuit is further configured to receive a command to read an egress register, the egress register comprises an indication of a timestamp format, and the egress timestamp is generated based on the indication.

14. The device of claim 8, wherein the egress timestamp is generated independent of a packet format of the first egress packet.

15. A computer program product comprising instructions stored in a tangible non-transitory computer-readable storage medium, the instructions comprising:

instructions to generate an egress timestamp corresponding to a time at which a first egress packet is transmitted to a network medium via a first physical interface;

instructions to receive, via a second physical interface, a second egress packet comprising the egress timestamp;

instructions to replace an error detection tag of the second egress packet with an error detection code generated based on content of the second egress packet to form a third egress packet; and instructions to transmit, via the first physical interface, the third egress packet to the network medium, the egress timestamp being included in the transmitted third egress packet.

16. The computer program product of claim 15, wherein the instructions further comprise instructions to transmit a notification to indicate that the egress timestamp is stored in a memory, the second egress packet being generated responsive to the notification.

17. The computer program product of claim 15, wherein the egress timestamp is generated in response to an indication contained in the first egress packet.

18. The computer program product of claim 15, wherein the instructions further comprise:

instructions to receive a command to read an egress register that comprises an egress identifier;

instructions to compare the egress identifier with a packet identifier contained in the first egress packet; and instructions to provide the egress timestamp for storage in a memory when the egress identifier matches the packet identifier.

19. The computer program product of claim 18, wherein the egress register further comprises an indication of a timestamp format, and the egress timestamp is generated based on the indication.

20. The computer program product of claim 15, wherein the egress timestamp is generated irrespective of a packet format of the first egress packet.

* * * * *